US012748693B2

(12) United States Patent
Lee

(10) Patent No.: US 12,748,693 B2
(45) Date of Patent: Sep. 29, 2026

(54) STORAGE DEVICE, METHOD OF OPERATING STORAGE DEVICE, AND STORAGE SYSTEM INCLUDING THE STORAGE DEVICE

(71) Applicant: SAMSUNG ELECTRONICS CO., LTD., Suwon-si (KR)

(72) Inventor: Youngmin Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/963,857

(22) Filed: Nov. 29, 2024

(65) Prior Publication Data

US 2025/0272234 A1 Aug. 28, 2025

(30) Foreign Application Priority Data

Feb. 23, 2024 (KR) ........................ 10-2024-0026758

(51) Int. Cl.
*G06F 12/00* (2006.01)
*G06F 12/02* (2006.01)

(52) U.S. Cl.
CPC ...... *G06F 12/0246* (2013.01); *G06F 12/0292* (2013.01)

(58) Field of Classification Search
CPC ......................... G06F 12/0246; G06F 12/0292
USPC .......................................................... 711/157
See application file for complete search history.

(56) References Cited

U.S. PATENT DOCUMENTS 8,185,778 B2 5/2012 Kilzer et al.
8,566,505 B2 10/2013 Kilzer et al.
9,417,821 B2 8/2016 Slaight et al.
10,572,391 B2 2/2020 Modi et al.
10,726,865 B2 7/2020 Gerhart et al.
11,036,646 B2 6/2021 Hsu et al.
11,237,769 B2 2/2022 Kanno
11,422,945 B2 8/2022 Palmer
2017/0039141 A1 2/2017 Yeh et al.
2020/0089407 A1 3/2020 Baca et al.
(Continued)

FOREIGN PATENT DOCUMENTS

EP 4024219 A1 * 7/2022 .......... G06F 11/1471

OTHER PUBLICATIONS

EP 4024219.*

*Primary Examiner* — Mardochee Chery
(74) *Attorney, Agent, or Firm* — MORGAN, LEWIS & BOCKIUS LLP

(57) ABSTRACT

A storage device includes a non-volatile memory device including a user area including a plurality of first memory blocks, and a meta area including an address mapping table including an address mapping information for the plurality of first memory blocks and a meta data mapping table including meta data for the address mapping table. The address mapping table includes a sub-address mapping table, and the meta data mapping table includes meta data for the sub-address mapping table. A storage controller of the storage device updates at least one of the meta data to perform a first update operation on the sub-address mapping table and address mapping information of the sub-address mapping table to perform a second update operation on the sub-address mapping table, and flushes the address mapping table into the meta area based on a result of the update.

19 Claims, 14 Drawing Sheets

(56) References Cited

U.S. PATENT DOCUMENTS

| | | | | |
|---|---|---|---|---|
| 2020/0272577 | A1* | 8/2020 | Zeng | G06F 12/1018 |
| 2021/0026763 | A1* | 1/2021 | Kim | G06F 12/1009 |
| 2021/0132827 | A1 | 5/2021 | Helmick et al. | |
| 2021/0165604 | A1* | 6/2021 | Kim | G06F 3/064 |
| 2021/0182166 | A1 | 6/2021 | Hahn et al. | |
| 2021/0303476 | A1* | 9/2021 | Yang | G06F 12/0891 |
| 2022/0317878 | A1 | 10/2022 | Lin | |
| 2022/0382453 | A1 | 12/2022 | Duan | |
| 2023/0137736 | A1 | 5/2023 | Cariello et al. | |
| 2023/0185727 | A1 | 6/2023 | Ambula et al. | |
| 2025/0272234 | A1* | 8/2025 | Lee | G06F 12/0292 |

* cited by examiner sMMT0

| INDEX | TABLE PAGE | BOOST FLAG BIT(BF) | START_PPN |
|---|---|---|---|
| INDEX00(sAMT00) | PPNt1 | 1(H) | PPN0 |
| INDEX01(sAMT01) | PPNt2 | 0(L) | - |
| INDEX02(sAMT02) | PPNt3 | 1(H) | - |
| INDEX03(sAMT03) | PPNt4 | 1(H) | PPN3m |
| ⋮ | | | |
| INDEX0n-1(sAMT0n-1) | PPNta | 0(L) | - |

sMMT0

| INDEX | TABLE PAGE | BOOST FLAG BIT(BF) | START_PPN |
|---|---|---|---|
| INDEX00(sAMT00) | PPNt1 → PPNtb+1 | 1(H) → 0(L) | PPN0 |
| INDEX01(sAMT01) | PPNt2 → PPNtb+2 | 0(L) | - |
| INDEX02(sAMT02) | PPNt3 | 1(H) | - → PPN4m |
| INDEX03(sAMT03) | PPNt4 | 1(H) | PPN3m |
| ⋮ | | | |
| INDEX0n-1(sAMT0n-1) | PPNta | 0(L) → 1(H) | - → PPN5m |

10b

STORAGE DEVICE, METHOD OF OPERATING STORAGE DEVICE, AND STORAGE SYSTEM INCLUDING THE STORAGE DEVICE

CROSS-REFERENCE TO RELATED APPLICATION

This patent application claims priority under 35 U.S.C. § 119 to Korean Patent Application No. 10-2024-0026758 filed in the Korean Intellectual Property Office on Feb. 23, 2024, the disclosure of which is incorporated by reference in its entirety herein.

(a) TECHNICAL FIELD

The present disclosure is directed to a storage device, an operation method of the storage device, and a storage system including the storage device.

(b) DISCUSSION OF RELATED ART

A non-volatile memory device is a memory device that retains stored data even when a power supply is cut off. Non-volatile memory devices include a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), and a ferroelectric RAM (FRAM).

Among them, the flash memory device stores a set of an address mapping information for operations such as reading and writing of data. Meta data representing the address mapping information may be stored in the flash memory.

The flash memory device includes non-volatile memory cells and a controller. Since the meta data is frequently updated, the controller may include a cache to store the meta data. The meta data may need to be periodically flushed from the cache to the non-volatile memory cells. However, frequent updates and flushes of the meta data may cause a flash wear and degrade performance.

SUMMARY

At least one embodiment provides a storage device with increased flush operation performance by reducing the amount of the meta data being flushed, and an operation method of the storage device.

At least one embodiment provides a storage device that increased a lifespan reliability of a meta area by reducing the amount of the meta data being flushed, and a method of operating the storage device.

According to an embodiment, a storage device includes a non-volatile memory device and a storage controller. The non-volatile memory device includes a user area including a plurality of first memory blocks, and a meta area including an address mapping table including an address mapping information for the plurality of first memory blocks and a meta data mapping table including a meta data for the address mapping table. The address mapping table includes a sub-address mapping table. The meta data mapping table includes meta data for the sub-address mapping table. The storage controller is configured to update at least one of the meta data to perform a first update operation and address mapping information of the sub-address mapping table to perform a second update operation, and flushing the address mapping table into the meta area based on a result of the update.

According to an embodiment, an operation method of a storage device includes: receiving a sub-address mapping table and meta data for the sub-address mapping table in response to an occurrence of an event; loading a meta data mapping table including the meta data into a memory; checking whether the sub-address mapping table is boosted based on the event; updating the meta data to perform a first update operation when a result of the checking indicates the sub-address mapping table is boosted; updating the address mapping information of the sub-address mapping table to perform a second update operation when the result indicates the sub-address mapping table is not boosted; and flushing the sub-address mapping table to the non-volatile memory device based on a result of the updating.

According to an embodiment, a storage system includes a storage device storing a data; and a host providing a request for the data to the storage device and including a host memory. The storage device includes a non-volatile memory device and a storage controller. The non-volatile memory device includes a user area including a plurality of first memory blocks storing the data, and a meta area including an address mapping table including an address mapping information for the plurality of first memory blocks and a meta data mapping table including meta data for the address mapping table. The address mapping table includes a sub-address mapping tables, and the meta data mapping table includes meta data for the sub-address mapping table. The storage controller is configured to update at least one of the meta data to perform a first update operation and the address mapping information to perform a second update operation, and flush the address mapping table into the meta area based on a result of the update.

DETAILED DESCRIPTION

Figure 1:
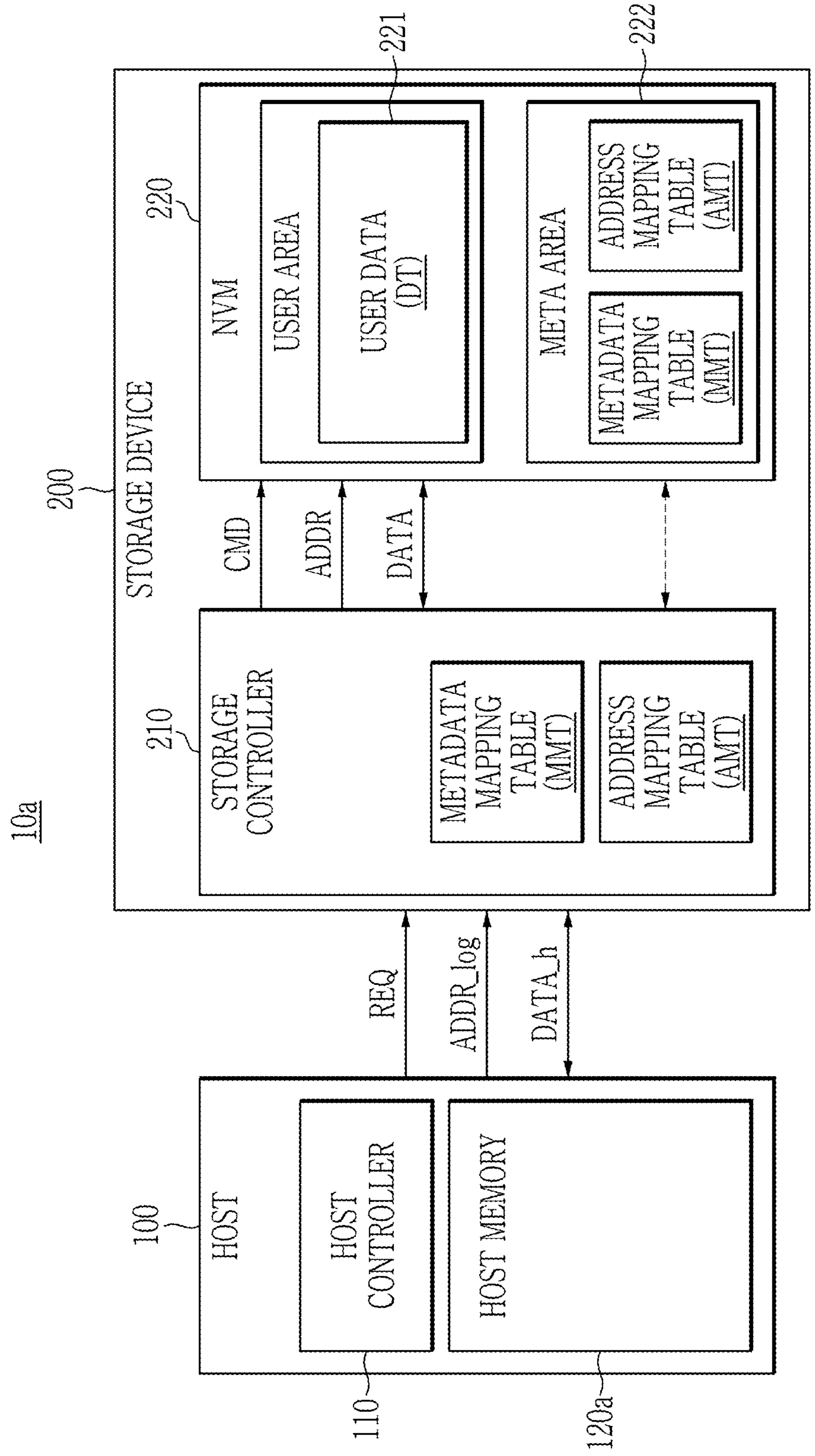
FIG. 1 is a block diagram showing a storage system according to an embodiment.

The present disclosure will be described more fully hereinafter with reference to the accompanying drawings, in which embodiments of the disclosure are shown. The described embodiments may be modified in various different ways, all without departing from the spirit or scope of the present disclosure.

Parts unrelated to the description of the embodiments may not be shown to make the description clear, and thus like reference numerals designate like element throughout the specification.

Additionally, a system including at least one of A, B, or C includes A alone, B alone, C alone, A and B, A and C, B and C, and/or A, B, and C together, but it is not limited to any one of these. Also, in detailed descriptions or claims or drawings, letters and/or phrases including two or more separated selectable terms should be considered as possible to include one, or either, or both terms. For example, the phrase 'A or B' should be understood as including the possibilities 'A', or 'B' or 'A and B'.

Terms such as "module," "unit," and "part" used in this document refer to a component that performs at least one function or operation, and these components may be implemented as a hardware or a software, or as a combination of hardware and software.

FIG. 1 is a block diagram showing a storage system according to an embodiment.

Referring to FIG. 1, a storage system 10*a* may include a host 100 and a storage device 200. Also, the storage device 200 may include a storage controller 210 (e.g., a controller circuit) and a non-volatile memory device 220. Additionally, according to an embodiment, the host 100 may include a host controller 110 (e.g., a controller circuit) and host memory 120*a*. The host memory 120*a* may function as a buffer memory to temporarily store data DATA_h to be transmitted to the storage device 200, or data DATA_h transmitted from the storage device 200.

The storage device 200 may include a storage controller 210 (e.g., a controller circuit) and a non-volatile memory device 220. The storage controller 210 and the non-volatile memory device 220 may be each provided with different chips, different packages, and different modules, and may be electrically connected. Also, the storage controller 210 and the non-volatile memory device 220 may be mounted based on packages such as a package on package (POP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flatpack (TQFP), a small outline (SOIC), a shrink small outline package (SSOP), a thin small outline (TSOP), a thin quad flatpack (TQFP), a system in package (SIP), a multi-chip package (MCP), a wafer-level fabricated package (WFP), a wafer-level processed stack package (WSP), or the like and be provided as a non-volatile memory system.

The storage controller 210 may receive a request REQ, an address ADDR_log, and a data DATA_h from the host 100, and control the non-volatile memory device 220 in response to the received signals. For example, the storage controller 210 may transmit a command CMD and an address ADDR to the non-volatile memory device 220 to write data DATA to the non-volatile memory device 220 or read data DATA stored in the non-volatile memory device 220. The data DATA may be generated based on DATA_h. The address ADDR may be generated based on the address ADDR_log.

Additionally, the request REQ may include read and write requests for data. According to an embodiment, the request REQ may include a sequential write, a discard request, etc., but is not limited thereto. For example, the request REQ for the sequential write may request that data be written to sequential addresses and the request REQ for the discard request may inform of certain data that is no longer needed and thus can be discarded.

As an example, the address ADDR_log received from the host 100 may be a logical address, and the address ADDR transmitted to the non-volatile memory device 220 may be a physical address of the non-volatile memory device 220. The logical address may point to the position of the data unit defined or managed by the host 100. The physical address may indicate a position of a data unit defined according to the operation characteristic of the non-volatile memory device 220. The storage controller 210 may convert the logical address to the physical address. The storage controller 210 may manage the above-described address mapping information based on an address mapping table (AMT). According to an embodiment, the storage controller 210 performs a conversion operation through the address mapping information including a mapping between logical pages and physical pages of the user area 221.

The non-volatile memory device 220 may write the data DATA received from the storage controller 210 or transmit the stored data DATA to the storage controller 210 according to the control of the storage controller 210. As an example, the non-volatile memory device 220 is assumed to include NAND flash memories, but is not limited thereto. The non-volatile memory device 220 may include the non-volatile memory devices such as a NAND flash, a PRAM, a ReRAM, MRAM, a FRAM, etc. having a 3-dimensional structure.

The non-volatile memory device 220 may include a user area 221 and a meta area 222. The user area 221 refers to an area that stores the user data DT, and the meta area 222 refers to an area that stores the address mapping table (AMT) and the meta data mapping table (MMT). The user data DT may refer to data used or generated in a software layer of the host 100, such as program codes, files, etc.

The information (i.e., the address mapping table AMT and the meta data mapping table MMT) stored in the meta area 222 (metadata) may include structured information of the user data DT stored in the user area 221 as meta data. According to an embodiment, the address mapping table AMT includes a plurality of sub-address mapping tables. Each of the plurality of sub-address mapping tables may include the address mapping information of the user data DT stored in the user area 221.

According to an embodiment, the meta data mapping table MMT stores the plurality of meta data for each of the plurality of sub-address mapping tables. The meta data may include a position within the meta area 222 of the sub-address mapping table, the pages within the sub-address mapping table, and a boost flag bit indicating whether or not the sub-address mapping table is boosted.

In the present disclosure, the boost may mean 'an operation of an entering, an updating, or a deleting of the meta data (e.g., an address mapping information) of a sub-address mapping table unit.' The boost may also mean an operation of creating or generating the meta data.

Examples of the boost may include sequential placement of the address mapping information for the logical addresses and physical addresses due to the sequential writing, or an invalidation of the sub-address mapping table due to a discard request, etc.

According to an embodiment, the meta data mapping table MMT includes a plurality of sub-meta data mapping tables. According to an embodiment, one sub-meta data mapping table is managed to correspond to units such as one memory block, a sub-block, a super block, a word line, a page, etc. within the meta area 222.

According to an embodiment, the meta area 222 stores information other than the address mapping table AMT and the meta data mapping table MMT.

According to an embodiment, the data DATA transmitted/received between the storage controller 210 and the non-volatile memory device 220 may include the user data DT, the address mapping table AMT, and the meta data mapping table MMT.

According to an embodiment, the non-volatile memory device 220 may program the user data DT in the user area 221 based on a multi level cell (MLC), a triple level cell (TLC), or a quad level cell (QLC) programming method. For example, the non-volatile memory device 220 may include one or more MLCs, TLCs, or QLCs for storing the user data DT. The non-volatile memory device 220 may program data in the meta area 222 based on a single level cell (SLC) programming method to increase the reliability of the data stored in the meta area 222. For example, the non-volatile memory device 220 may include one or more SLCs for storing the meta area 222. The data stored in the meta area 222 may have higher reliability than the data stored in the user area 221.

According to an embodiment, the size of the program unit of the user data DT in the user area 221 and the size of the program unit of the meta data in the meta area 222 are different. According to an embodiment, to increase the data reliability, the size of the program unit of the meta data in the meta area 222 is larger than the size of the program unit of the user data DT in the user area 221. According to an embodiment, in the non-volatile memory device 220, for the program operation on the meta data in the meta area 222, a number of partial program (NOP) mode may not be supported.

The storage controller 210 may read the address mapping table AMT and the meta data mapping table MMT stored in the meta area 222 and perform an address mapping operation based on the read address mapping table AMT and the meta data mapping table MMT.

As an example, the storage controller 110 may update the address mapping table AMT and the meta data mapping table MMT according to the request REQ from an external device such as the host 100. The updated address mapping table AMT and meta data mapping table MMT may be flushed to the non-volatile memory device 220. As an example, the flush operation of the storage controller 210 may be performed while the storage device 200 is in an idle state or performing a background operation.

Figure 2:
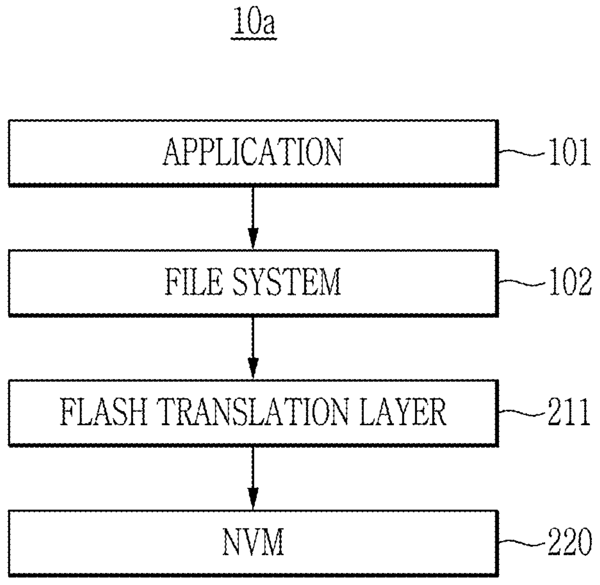
FIG. 2 is a block diagram to illustratively explain a software layer of a storage system according to an embodiment.

FIG. 2 is a block diagram to illustratively explain a software layer of a storage system according to an embodiment.

Referring to FIG. 1 and FIG. 2, the software layer of the storage system 10*a* may include an application 101, a file system 102, and a flash conversion layer 211. The application 101 may refer to various application programs running on the host 100. For example, the application 101 may include an operating system, a text editor, a web browser, an image player, a game program, etc.

The file system 102 plays the role of organizing files or data used by the application 101 when they are stored in the non-volatile memory device 220. For example, file system 102 may provide the logical address ADDR_log of the file or the data to the storage device 200. As an example, the file system 102 may have different forms depending on the operating system (OS) of the host 100. For example, the file system 102 may include a file allocation table (FAT), a FAT32, a NT File System (NTFS), a hierarchical file system (HFS), a journaled file system2 (JSF2), XFS, an on-disk structure-5 (ODS-5), UDF, ZFS, a Unix file system (UFS), ext2, ext3, ext4, ReiserFS, Reiser4, ISO 9660, Gnome VFS, BFS, WinFS, or the like. As an example, the file system 102 may define data as a sector or a logical block address (LBA) unit.

According to an embodiment, the application 101 and the file system 102 are driven by the host 100, and the application 101 and the file system 102 are loaded into the host memory 120*a*.

The flash conversion layer 211 (hereinafter referred to as 'FTL') may provide an interface between the host 100 and the non-volatile memory device 220 so that the non-volatile memory device 220 may be used efficiently.

For example, the non-volatile memory device 220 may write and read data in a page unit. However, because the file system 102 manages the data or the files by a sector or a logical block address unit, the FTL 211 may receive the logical address ADDR_log and play the role of converting it into the physical address ADDR that is usable in the non-volatile memory device 220. The FTL 211 may manage these address mapping operations through the address mapping table AMT.

For example, the FTL 211 may perform operations such as a garbage collection (GC), wear leveling, etc. For example, the FTL 211 may manage the number of programing/erasing cycles of the plurality of memory blocks included in the non-volatile memory device 220, and perform a wear leveling based on this so that the number of the programing/erasing cycles of the plurality of memory blocks is equalized.

The FTL 211 according to the embodiment may perform update operations of the address mapping table AMT and the meta data mapping table MMT, and perform the load and flush operations in the memory (213 in FIG. 4) after the update. The detailed descriptions of the update operation, the load operation, and the flush operation are described later through FIG. 8 to FIG. 12 as an example.

The FTL 211 according to an embodiment logs (or stores) the address mapping information within the address mapping table AMT. For example, if one sub-address mapping table included in the address mapping table AMT includes consecutive logical page numbers and consecutive pages corresponding thereto, the FTL 211 may log the continuity of the address mapping information for the logical page numbers and pages.

According to an embodiment, if a first sub-address mapping table is in a full state (FULL) with the continuous address mapping information, the FTL 211 may determine that the first sub-address mapping table has been boosted.

According to an embodiment, if a second sub-address mapping table includes the page of the physical address information in a vacant state (VACANT), the FTL 211 may determine that the second sub-address mapping table has been boosted.

Figure 3:
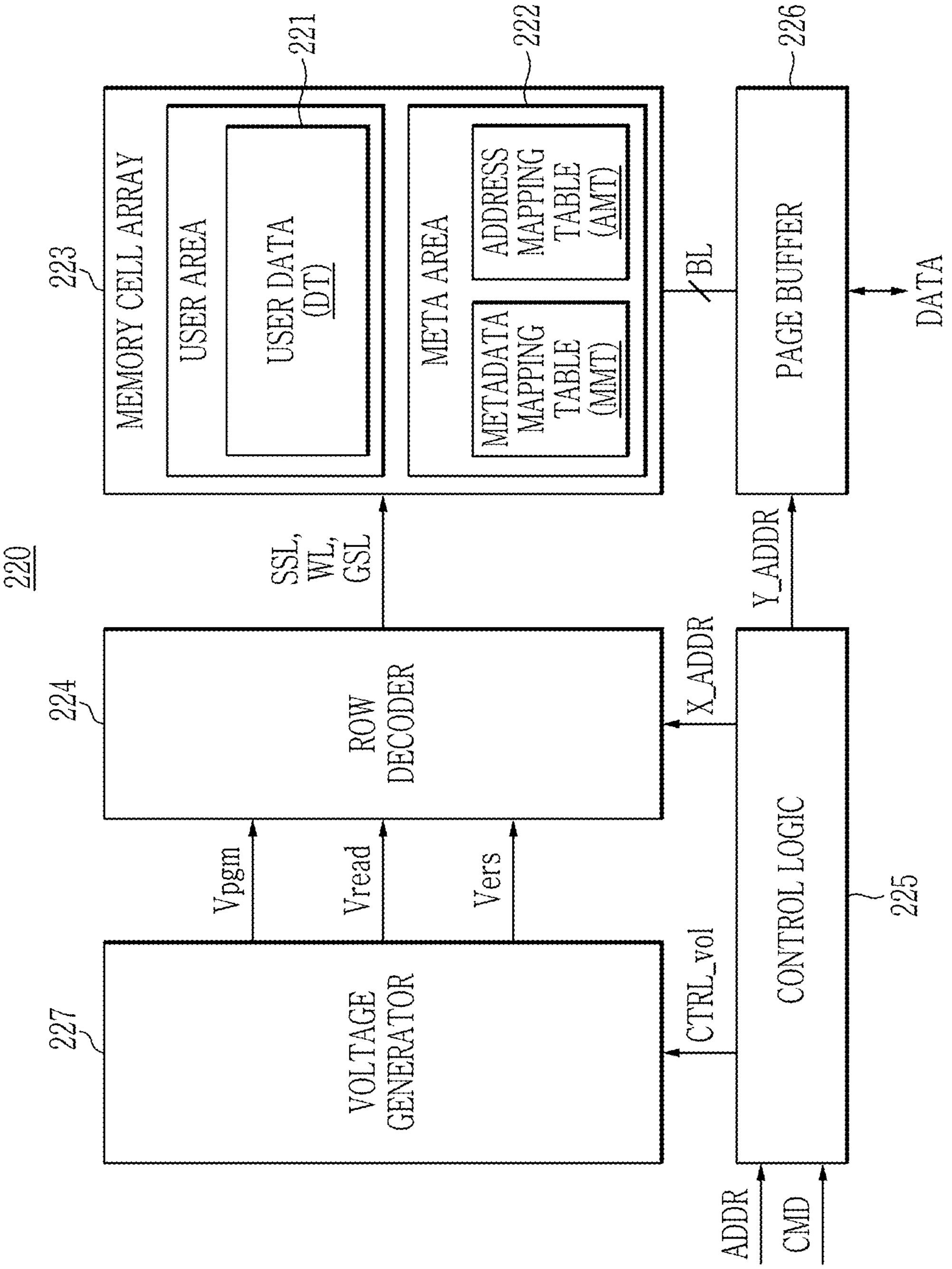
FIG. 3 is a block diagram showing a non-volatile memory device according to an embodiment.

FIG. 3 is a block diagram showing a non-volatile memory device according to an embodiment.

Referring to FIG. 1 and FIG. 3, the non-volatile memory device 220 may include a memory cell array 223, a control logic 225 (e.g., a logic circuit), a row decoder 224 (e.g., a decoder circuit), a page buffer circuit 226, and a voltage generator 227. The non-volatile memory device 220 according to an embodiment may further include a memory interface circuit, and may further include a column logic, a pre-decoder, a temperature sensor, a command decoder, an address decoder, etc.

The memory cell array 223 may be connected to the page buffer circuit 226 through a bit line BL, and may be connected to the row decoder 224 through a plurality of word lines WL, a plurality of string selection line SSL, and a plurality of ground selection lines GSL.

The memory cell array 223 may include a user area 221 and a meta area 222. The user area 221 may store the user data DT, and the meta area 222 may include the address mapping table AMT and the meta data mapping table MMT.

Each of the user area 221 and the meta area 222 may include a plurality of memory blocks. Each of the plurality of memory blocks may include a plurality of pages, and each of the plurality of pages may include a plurality of memory cells.

According to an embodiment, the memory blocks included in the user area 221 are multi level cell blocks including the multi level cell MLC that stores at least 2-bit data, or a triple level cell block including the triple level cell TLC, or a quad level cell block including the quad level cell QLC. According to an embodiment, the memory block included in the meta area 222 is a single level cell block including a single level cell SLC that stores 1-bit data.

The control logic 225 may control various operations within the non-volatile memory device 220. The control logic 225 may output various control signals in response to the command CMD and/or the address ADDR received from the storage controller 210. The control logic 225 may output the control signals to write or program the data DATA to the memory cell array 223, read the data DATA from the memory cell array 223, or erase the data stored in the memory cell array 223. For example, the control logic 225 may output a voltage control signal CTRL_vol, a row address X-ADDR, and a column address Y-ADDR.

The various control signals output from the control logic 225 may be provided to the voltage generator 227, the row decoder 224, and the page buffer circuit 226. The control logic 225 may provide the voltage control signal CTRL_vol to the voltage generator 227.

The voltage generator 227 may be connected to the memory cell array 223 through the plurality of word lines WL. The voltage generator 227 may generate various types of voltages to perform the program, read, and erase operations on the memory cell array 223 based on the voltage control signal CTRL_vol. The voltage generator 227 may generate, for example, a program voltage Vpgm, a pass voltage Vpass, and an erase voltage Vers. According to an embodiment, the pass voltage Vpass may be a voltage applied to an unselected word line during the read or verify operation.

The row decoder 224 may select a specific word line among the word lines WL in response to the row address X-ADDR received from the control logic 225. Specifically, during the program operation, the row decoder 224 may provide the program voltage Vpgm to the selected word line. In addition, the row decoder 224 may select some string selection lines among the string selection lines SSL or some ground selection lines among the ground selection lines GSL in response to the row address X-ADDR received from the control logic 225.

The page buffer circuit 226 may be connected to the memory cell array 223 through a plurality of bit lines BL. The page buffer circuit 226 may select some bit lines from the plurality of bit lines BL in response to the column address Y-ADDR received from the control logic 225. During the program operation or the read operation, the page buffer circuit 226 may operate as a sense amplifier and sense the data DATA stored in the memory cell array 223. Meanwhile, during the program operation, the page buffer circuit 226 may operate as a write driver and input the data DATA to be stored in the memory cell array 223. The page buffer circuit 226 may store the data DATA read from the memory cell array 223, or store the data DATA to be written into the memory cell array 223.

Figure 4:
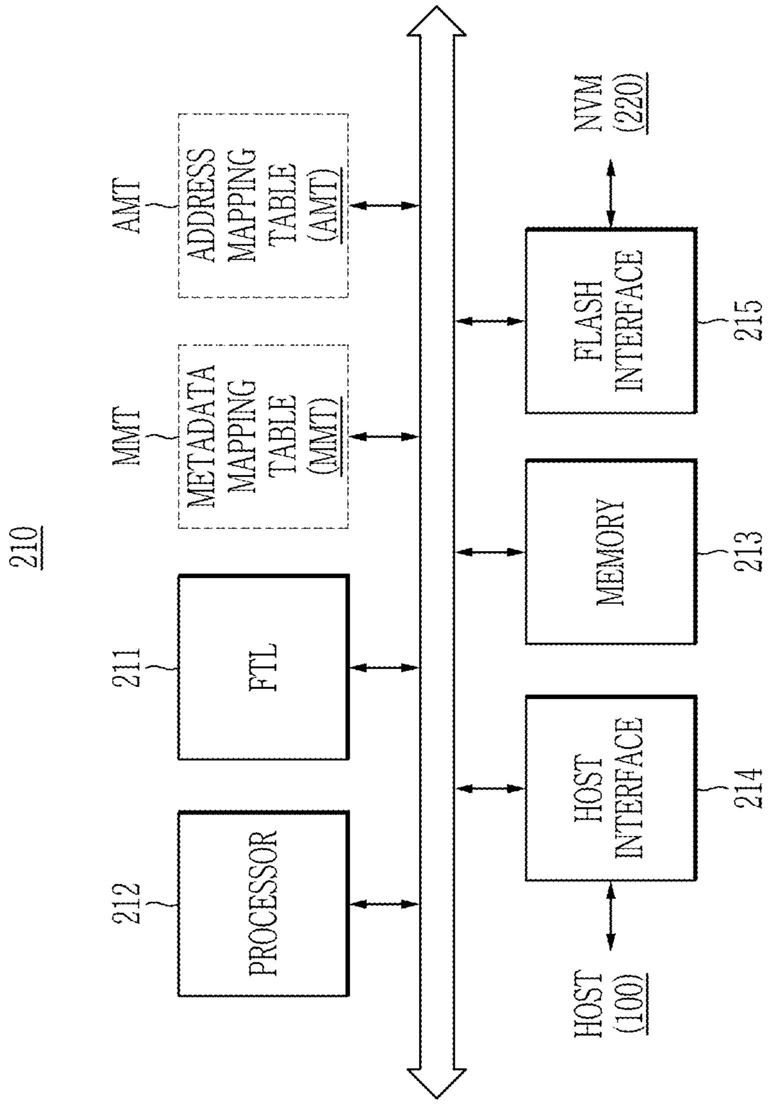
FIG. 4 is a block diagram showing a storage controller according to an embodiment.

FIG. 4 is a block diagram showing a storage controller according to an embodiment. Referring to FIG. 1 and FIG. 4, the storage controller 210 may include an FTL 211, a processor 212, an address mapping table AMT and a meta data mapping table MMT, a memory 213, a host interface 214, and a flash interface 215. The FTL 211, the address mapping table AMT, and the meta data mapping table MMT has been described in detail with reference to FIG. 1 to FIG. 3, and thus a further detailed description thereof is omitted.

The processor 212 may control an overall operation of the memory controller 210. The memory 213 may operate as a buffer memory, a cache memory, or an operation memory of the processor 212. According to an embodiment, the memory 213 may include a dynamic random-access-memory (DRAM), a static random-access-memory (SRAM), etc., but is not limited thereto.

The storage controller 210 may communicate with the host 100 through the host interface 214. For example, the host interface 214-may include various interfaces such as Universal Serial Bus (USB), multimedia card (MMC), peripheral component interconnection (PCI), PCI-express (PCI-E), Advanced Technology Attachment (ATA), Serial-ATA, Parallel-ATA, small computer small interface (SCSI), enhanced small disk interface (ESDI), Integrated Drive Electronics (IDE), Mobile Industry Processor Interface (MIPI), and NVMe. The storage controller 210 may communicate with the non-volatile memory device 220 through the flash interface 215.

As an example, the storage controller 210 may read the address mapping table AMT and the meta data mapping table MMT stored in the meta area 222 of the non-volatile memory device 220. The address mapping table AMT and the meta data mapping table MMT read from the non-volatile memory device 220 may be loaded into the memory 213 and be managed by the processor 212 through the update operation, the flush operation, etc.

According to an embodiment, the FTL 211 may be provided in a hardware or software form. The FTL 211 may be driven by the processor 212. According to an embodiment, when the FTL 211 is provided in a software form, it may be loaded into the memory 213 and operated on by the processor 212. According to an embodiment, the FTL 211 is provided in a hardware form as a dedicated circuit.

For example, the address mapping table AMT, the meta data mapping table MMT, and the FTL 211 may be stored in the memory 213. The address mapping table AMT, the meta data mapping table MMT, and the FTL 211 stored in the memory 213 may be operated on by the processor 212.

Figure 5:
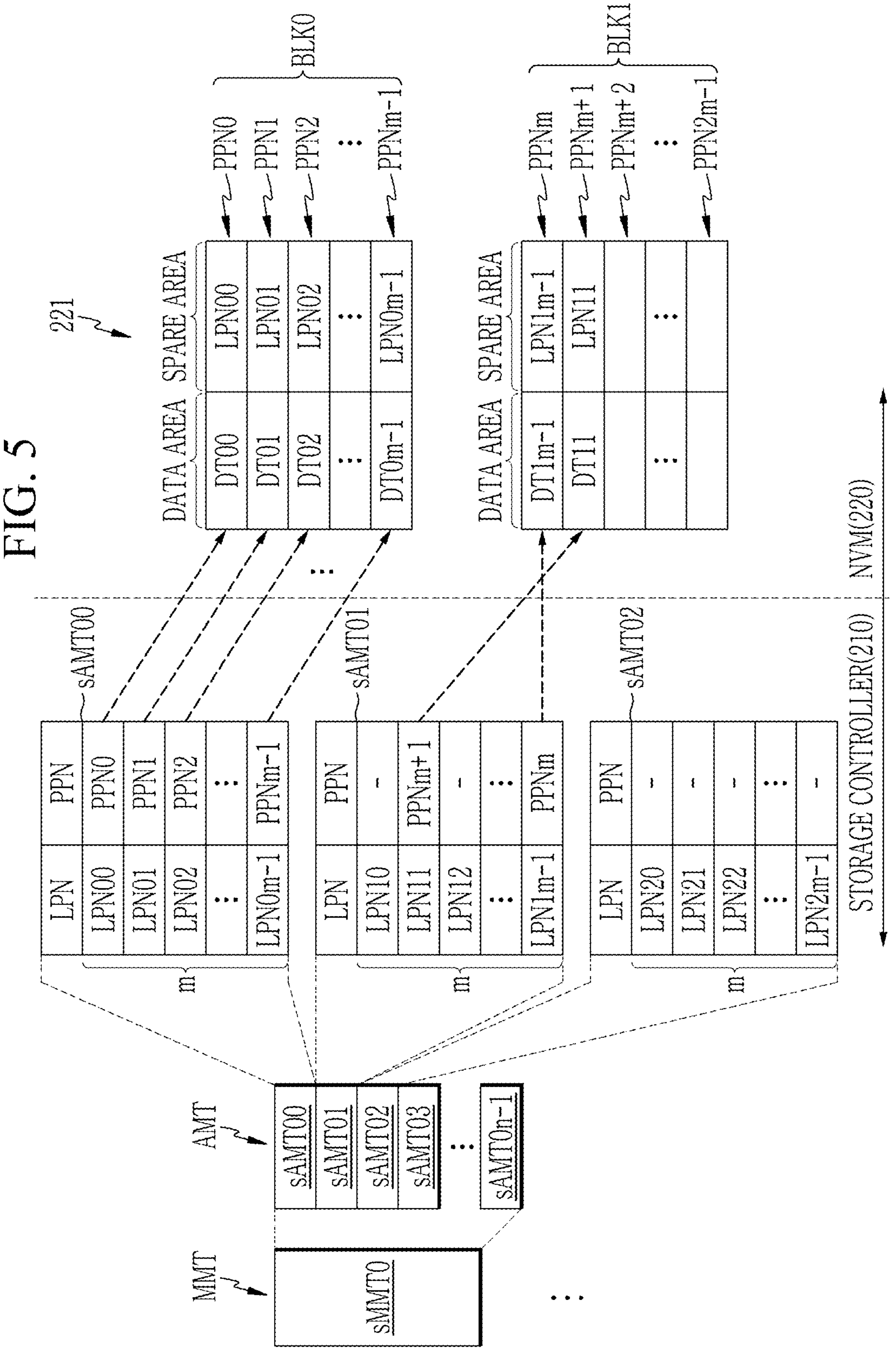
FIG. 5 is a view to explain an address mapping information between a storage controller and a non-volatile memory device according to an embodiment.

FIG. 5 is a view to explain an address mapping information between a storage controller and a non-volatile memory device according to an embodiment.

Referring to FIG. 5, to facilitate an explanation, it is assumed that the storage controller 210 operates based on a full-page mapping scheme. However, the range of the present disclosure is not limited thereto, and the storage controller 210 may operate based on various mapping schemes, such as a block mapping scheme and a hybrid mapping scheme.

As an example, the logical page number (LPN) may indicate a logical position of data generated based on the logical address (the ADDR_log in FIG. 1) received from the host 100. The physical page number (PPN) may indicate a physical position of the plurality of pages included in the non-volatile memory device 220.

For ease of explanation, it is assumed that the user area 221 includes 0-th and first memory blocks BLK0 and BLK1, the 0-th memory block BLK0 includes 0-th to (m−1)−th pages PPN0 to PPN(m−1), and the first memory block BLK1 includes m to 2m−1 pages PPNm to PPN2*m*−1. In addition, the 0-th to 2(m−1)−th pages PPN0 to PPN2(*m*−1) include a data area for storing the user data DT and a spare area for storing the logical page number (LPN), respectively. However, it is not limited to examples of the area settings.

Referring to FIG. 1, FIG. 4, and FIG. 5, the storage controller 210 may read the address mapping table AMT and the meta data mapping table MMT stored in the meta area 222, and may store the read address mapping table AMT and meta data mapping table MMT in the memory 213. The address mapping table AMT may include a plurality of 0-th sub-address mapping tables sAMT00-SAMT0(*n*−1) and a sub-Address Mapping Table. The meta data mapping table MMT may include a plurality of sub-meta data mapping tables including a 0-th sub-meta data mapping table sMMT0.

The 0-th sub-meta data mapping table sMMT0 may include meta data of a plurality of 0-th sub-address mapping tables SAMT00 to sAMT0(*n*−1). According to an embodiment, the 0-th sub-meta data mapping table sMMT0 stores meta data for n address mapping tables. According to an embodiment, the size of the 0-th sub-meta data mapping table sMMT0 may be 4 Kilobytes (KB) or 16 KB, but is not limited thereto.

Each of the plurality of 0-th sub-address mapping tables SAMT00 to SAMT0(*n*−1) may include an address mapping information between logical page numbers and physical page numbers of a predetermined number (e.g., a mappings between logical page numbers and physical page numbers). According to an embodiment, the plurality of 0-th sub-address mapping tables SAMT00 to sAMT0(*n*−1) each may include m address mapping information. The m is a positive integer, and may be 1024 or 4096 according to an embodiment, but is not limited thereto. The size of each of the plurality of 0-th sub-address mapping tables sAMT00 to sAMT0(*n*−1) may be 4 KB or 16 KB, but is not limited thereto.

For example, the 0_0 sub-address mapping table SAMT00 may include an address mapping information for the 0_0 to 0_(m−1)−th logical page numbers LPN00 to LPN0(*n*−1). The 0_0 sub-address mapping table sAMT00 may include address mapping information (e.g., a first mapping) between the 0_0 logical page number LPN00 and the 0-th page PPN0, address mapping information (e.g., a second mapping) between the 0_1 logical page number LPN01 and the first page PPN1, an address mapping information (e.g., a third mapping) between the 0_2 logical page number LPN02 and the second page PPN2, . . . , and an address mapping information (e.g., a fourth) between the 0_(m−1) logical page number LPN0(*m*−1) and the (m−1)−th page PPN(*m*−1).

The 0_0 sub-address mapping table sAMT00 may include 0-th to (m−1)−th pages PPN(m−1) corresponding to the consecutive 0_0 to 0_(m−1)−th logical page numbers LPN00 to LPN0(*m*−1). For example, the 0_0 sub-address mapping table sAMT00 may identify the 0-th to (m−1)−th pages PPN(m−1) that correspond to respective logical pages of the consecutive 0_0 to 0_(m−1)−th logical page numbers LPN00 to LPN0(*m*−1). The FTL 211 may determine that the 0_0 sub-address mapping table sAMT00 has been boosted.

For example, the 0_1 sub-address mapping table SAMT01 may include an address mapping information for the 1_0 to 1_(m−1) logical page numbers LPN10 to LPN1(*m*−1). The 0_1 sub-address mapping table sAMT01 may include an address mapping information (e.g., a first mapping) between the 1_1 logical page number LPN11 and the (m+1)−th page PPN(m+1), address mapping information (e.g., a second mapping) between the 1_(m−1) logical page number LPN1(*m*−1) and the m page PPNm, and an address mapping information between an empty page and the remaining logical page numbers LPN10 and LPN12-LPN (m−2). For example, a logical page being mapped to an empty page in a sub-address mapping table may mean that the logical page is not presently mapped to a physical page in the table.

Since the 0_1 sub-address mapping table SAMT01 includes discontinuous address mapping information, the FTL 211 may determine that the 0_1 sub-address mapping table sAMT01 has not been boosted. For example, when a logical page in a sub-address mapping table is not mapped to a corresponding physical page but is located between two logical pages that are mapped to a corresponding physical page, the sub-address mapping table has not been boosted.

For example, the 0_2 sub-address mapping table SAMT02 may include an address mapping information for the 2_0 to 2_(m−1) logical page number LPN20 to LPN2(*m*−1). The 0_2 sub-address mapping table sAMT02 may include an address mapping information between the empty page and the corresponding 2_0 to 2_(m−1) logical page numbers LPN20 to LPN2(*m*−1). The FTL 211 may determine that the 0_2 sub-address mapping table sAMT02 has been boosted. For example, when none of the logical pages in a sub-address mapping table are mapped to a corresponding physical page, the sub-address mapping table is boosted.

In the user area 221, like the information stored in the 0_1 sub-address mapping table sAMT01, the 0_0 user data DT00 may be stored in the data area of the 0-th page PPN0, and the 0_0 logical page number LPN00 may be stored in the spare area of the 0-th page PPN0. Likewise, based on the continuity, the 0_1 to the 0-(m−1) user data DT01 to DT0(*m*−1) may be stored in the data area of the first to the (m−1)−th pages PPN1 to PPN(m−1), and the 0_1 to the 0-(m−1) logical page numbers LPN01 to LPN0(*m*−1) may be stored in the spare area of the first to the (m−1)−th pages PPN1 to PPN(m−1).

Due to the continuity, even if the address mapping information that is the start of the boosted sub-address mapping table is known and other address mapping information is not known, the FTL 211 according to the embodiment may perform the conversion from a logical address to a physical address based on this.

As an example, the 0_1 user data DT01 may be stored in the data area of first page PPN1, and the 0_1 logical page number LPN01 may be stored in the spare area of the first page PPN1. The 0_2 user data DT02 may be stored in the data area of the second page PPN2, and the 0_2 logical page number LPN02 may be stored in the spare area of the second page PPN2. The 0_(m−1) user data DT0(*m*−1) may be stored in the data area of the (m−1)-th page PPN(m−1), and the 0_(m−1) logical page number LPN0(*m*−1) may be stored in the spare area of the (m−1)-th page PPN(m−1). The 0_0 to 0_(m−1) user data DT00 to DT0(*m*−1) may be a data pointed by the 0_0 to 0_(m−1) logical page numbers LPN00 to LPN0(*m*−1), respectively.

Like the information stored in the 0_1 sub-address mapping table SAMT01, the 1_(m−1) user data DT1(*m*−1) may be stored in the data area of the m page PPNm, and the 1_(m−1) logical page number LPN1(*m*−1) may be stored in the spare area of the m-th page PPNm. Likewise, the 1_1 user data DT11 may be stored in the data area of the (m+1) page PPN(m+1), and the 1_1 logical page number LPN11 may be stored in the spare area of the (m+1) page PPN(m+1). The remaining pages PPN(*m*+2) to PPN(2*m*−1) in the first memory block BLK1 may have vacant data. For example, when a page has vacant data, no data is present in the page or invalid data is present in the page.

Figures 6, 7:
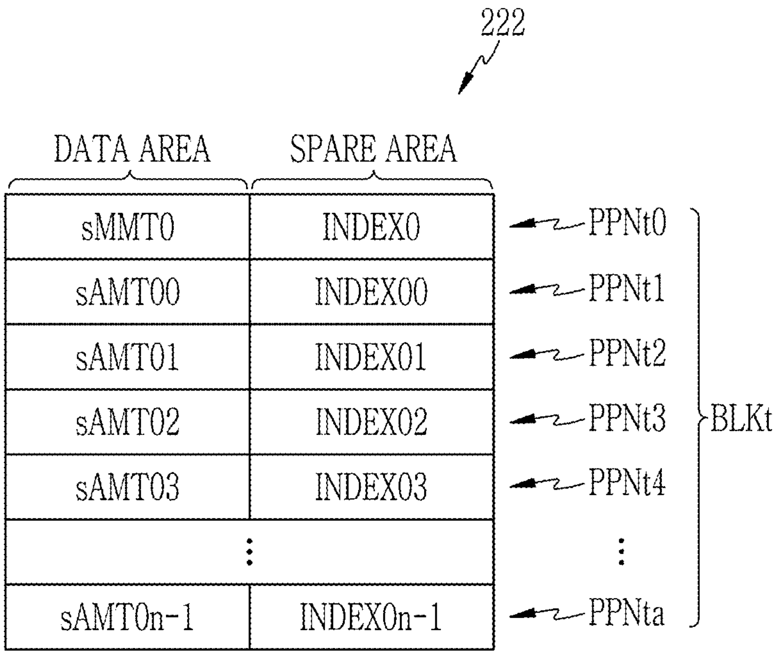
FIG. 6 is a view to explain a meta data mapping table according to an embodiment.
FIG. 7 is a view to explain a meta area according to an embodiment.

FIG. 6 is a view to explain a meta data mapping table according to an embodiment. FIG. 7 is a view to explain a meta area according to an embodiment.

For ease of explanation, it is assumed that the 0-th sub-meta data mapping table sMMT0 in FIG. 6 includes information based on a plurality of 0-th sub-address mapping tables SAMT00 to SAMT0(*n*−1) in FIG. 5. The meta area 222 in FIG. 7 stores the plurality of 0-th sub-address mapping tables sAMT00 to SAMT0(*n*−1) based on the content of the 0-th sub-meta data mapping table SMMT0 of FIG. 6.

Also, it is assumed that the meta area 222 includes the t-th memory block BLKt, and the t-th memory block BLKt includes the 0-th to a-th table pages PPNt0 to PPNta (a is an integer greater than or equal to 4). Also, each of the 0-th to a-th table pages PPNt0 to PPNta includes a data area to store a sub-address mapping table, and includes a spare area to store a logical address for the sub-address mapping table. However, it is not limited to examples of the area settings.

Referring to FIG. 1, FIG. 4, FIG. 5, FIG. 6, and FIG. 7, the 0-th sub-meta data mapping table sMMT0 may include a meta data for 0_0 to 0_(n−1) index INDEX00 to INDEX0(*n*−1). The 0_0 to the 0_(n−1) index INDEX00 to INDEX0(*n*−1) may each point to the 0_0 to the 0_(n−1) sub-address mapping tables sAMT00 to sAMT0(*n*−1). According to an embodiment, the 0_0 to the 0_(n−1) index INDEX00 to INDEX0(*n*−1) may be replaced with a logical address for the 0_0 to the 0_(n−1) sub-address mapping tables SAMT00 to SAMT0(*n*−1). According to an embodiment, the 0_0 to the 0_(n−1) index INDEX00 to INDEX0(*n*−1) may correspond to a minimum logical page number within the 0_0 to the 0_(n−1) sub-address mapping tables sAMT00 to sAMT0(*n*−1).

The 0-th sub-meta data mapping table sMMT0 may include a 0_0 index INDEX00, a first table page PPNt1 corresponding to the 0_0 index INDEX00, a boost flag bit BF of a logical row L, and a vacant start page.

The table page may refer to a physical address within the meta area 222 where the sub-address mapping table is stored.

The boost flag bit BF may indicate whether the sub-address mapping table is boosted. According to an embodiment, a logical high of the boost flag bit BF means that the sub-address mapping table is boosted, and a logical low of the boost flag bit BF means that the sub-address mapping table is not boosted, but is not limited to this. A sub-address mapping table being boosted may mean that it includes sequential addresses and a sub-address mapping table not being boosted may indicate it does not include sequential addresses.

The start page START_PPN may be a physical page number corresponding to the minimum logical page number of the sub-address mapping table. When the 0_0 sub-address mapping table SAMT00 is described as an example, the start page START_PPN of the 0_0 sub-address mapping table SAMT00 may be the 0-th page PPN0 corresponding to the minimum 0_0 logical page number LPN00. Referring to the 0_1 sub-address mapping table sAMT01 as an example, the start page START_PPN of the 0_1 sub-address mapping table sAMT01 may be an empty page corresponding to the minimum 1_0 logical page number LPN10.

Likewise, the 0-th sub-meta data mapping table sMMT0 may include a meta data including a 0_1 index INDEX01, a second table page PPNt2 corresponding to the 0_1 index INDEX01, a boost flag bit BF of a logic low L, and the start page START_PPN of a 0-th page PPN. In addition, the 0-th sub-meta data mapping table sMMT0 may include a meta data including a 0_2 index INDEX02, a third table page PPNt3 corresponding to the 0_2 index INDEX02, a boost flag bit BF of logic high H, and a vacant start page.

In addition, the 0-th sub-meta data mapping table sMMT0 may include a meta data including a 0_3 index INDEX03, a fourth table page PPNt4 corresponding to the 0_3 index INDEX03, a boost flag bit BF of logic high H, and a start page START_PPN, which is a 3m page PPN3*m*.

Also, the 0-th sub-meta data mapping table sMMT00 may include a meta data including a 0_(n−1) index INDEX0(*n*−1), an a-th table page PPNta corresponding to the 0_(n−1) index INDEX0(*n*−1), a boost flag bit BF of logic low L, and a vacant start page. The boost flag bit may also be referred to as a state indicator bit since it may indicate the state of a sub-address mapping table. The meta data corresponding to the 0_3 to 0_(n−1) index INDEX03 to INDEX0(*n*−1) of FIG. 6 may be included in the 0-th sub-meta data mapping table sMMT0 according to an embodiment and is example information not shown in FIG. 5.

In the user area 221, like the information stored in the 0-th sub-meta data mapping table sMMT0, the 0_0 sub-address mapping table sAMT00 may be stored in the data area of the first table page PPNt1, and the 0_0 index INDEX00 may be stored in the spare area of the first table page PPNt1. The 0_1 sub-address mapping table sAMT01 may be stored in the data area of the second table page PPNt2, and the 0_1 index INDEX01 may be stored in the spare area of second table page PPNt2. The 0_2 sub-address mapping table sAMT02 may be stored in the data area of third table page PPNt3, and the 0_2 index INDEX02 may be stored in the spare area of third table page PPNt3. The 0_3 sub-address mapping table sAMT03 may be stored in the data area of fourth table page PPNt4, and the 0_3 index INDEX03 may be stored in the spare area of fourth table page PPNt3. The 0_(n−1) sub-address mapping table sAMT0(*n*−1) may be stored in the data area of a-th table page PPNta, and the 0_(n−1) index may be stored in the spare area of a-th table page PPNta. INDEX0(*n*−1).

According to an embodiment, the 0-th sub-meta data mapping table sMMT0 may be stored in the data area of the 0-th table page PPNt0, and the 0-th index INDEX0 may be stored in the spare area of the 0-th table page PPNt0. According to an embodiment, the 0-th index INDEX0 may be replaced with a logical address for the 0-th sub-meta data mapping table sMMT0. Exemplarily, the 0-th index INDEX0 may be a data to identify the 0-th sub-meta data mapping table sMMT0 between the plurality of sub-meta data mapping tables sMMT0 to sMMTi of FIG. 13, and may be managed by a separate mapping table, but it is limited thereto. According to an embodiment, the FTL 211 performs an address mapping operation based on the 0-th index INDEX0 to convert the 0-th table page PPNt0, which is the physical address for the 0-th sub-meta data mapping table SMMT0.

Figure 8:
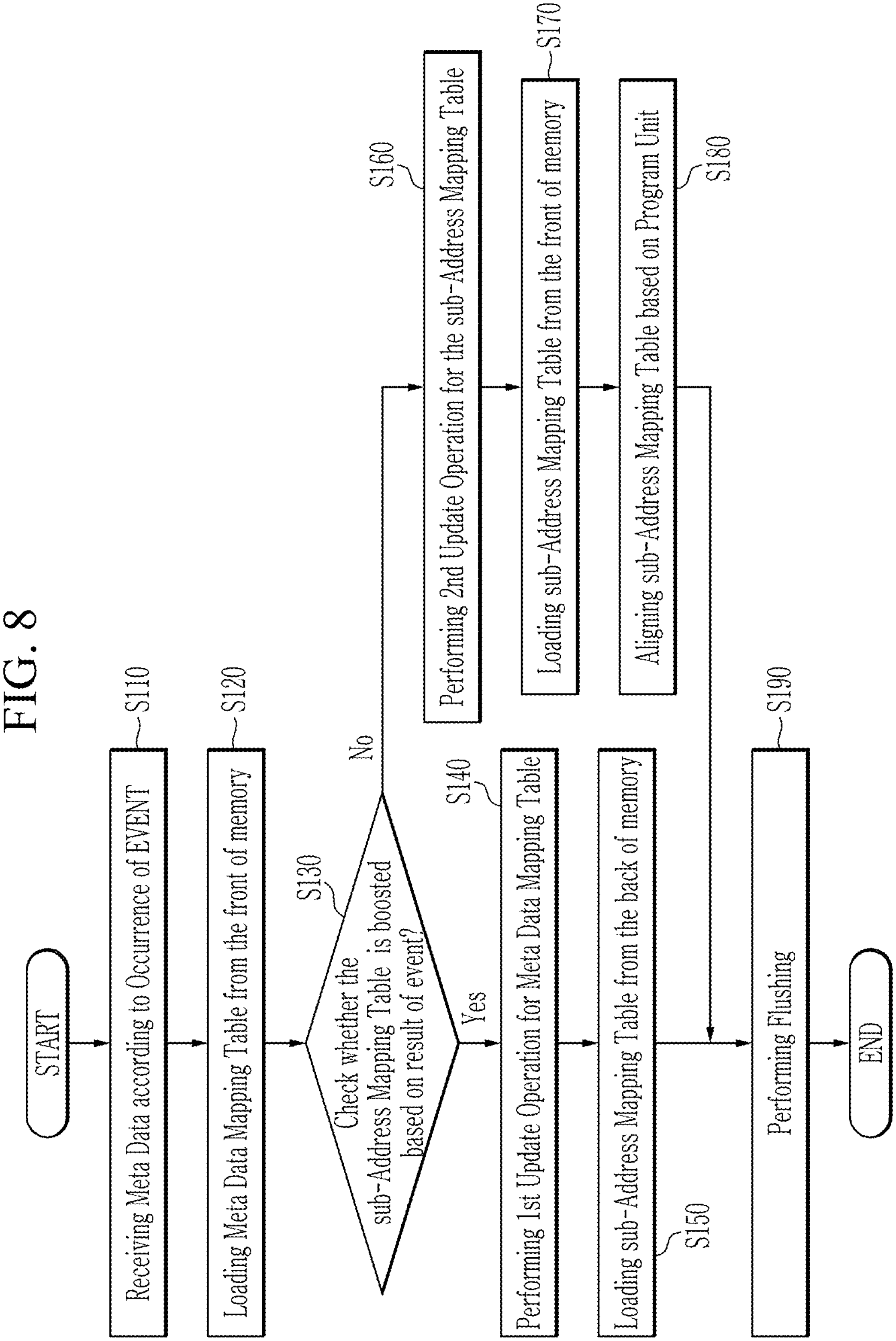
FIG. 8 is a flowchart showing an operation method of a storage controller according to an embodiment.

FIG. 8 is a flowchart showing an operation method of a storage controller according to an embodiment. FIG. 9 to FIG. 12 are views to explain an operation method of a storage controller according to an embodiment.

FIG. 9 to FIG. 12 show the update and the flush operation of the meta data of the storage controller 210 according to an embodiment in a state assuming the user area 221 and the meta area 222 are configured as shown in FIG. 5 to FIG. 7. Additionally, the meta area 222, in addition to the t-th memory block BLKt of FIG. 7, may further include a plurality of table pages including a b-th table page PPNtb to a (b+5)-th table page.

Referring to FIG. 1, and FIG. 4 to FIG. 12, a storage controller 210 receives meta data depending on an occurrence of an event (S110).

According to an embodiment, the event may be a situation that generates an update operation for an address mapping information and other meta data. Examples of the event may include a reception of the request REQ from the host 100 of the storage controller 210, or internal operations of the FTL 211 such as a garbage collection (GC), wear leveling, etc.

Figure 9:
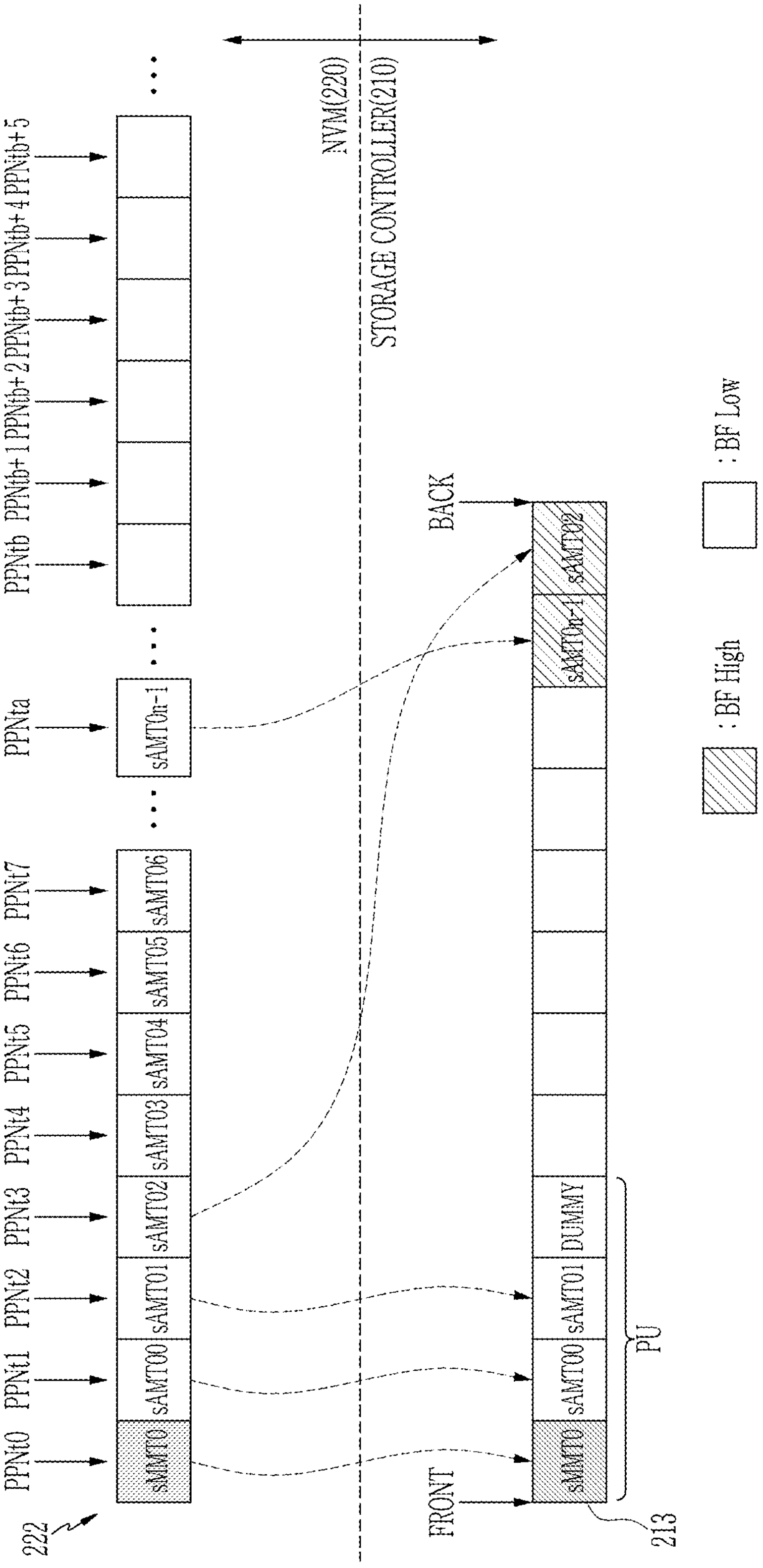
FIG. 9 to FIG. 12 are views to explain an operation method of a storage controller according to an embodiment.

Referring to FIG. 9 as an example, the storage controller 210, based on the event occurrence, may receive a 0-th sub-meta data mapping table sMMT0, a 0_0 sub-address mapping table sAMT00, a 0_1 sub-address mapping table sAMT01, a 0_2 sub-address mapping table sAMT02, and a 0_(n−1) sub-address mapping table sAMT0(*n*−1) from the meta area 222.

FTL 211 loads the meta data mapping table MMT from the front of the memory 213 (S120).

Referring to FIG. 9 as an example, the FTL 211 may load the 0-th sub-meta data mapping table sMMT0 from the 0-th table page PPNt0 of the meta area 222 to the front of the memory 213. In an embodiment, the front of the memory 213 corresponds to memory cells of the memory 213 disposed in a first region (e.g., front memory cells) that are adjacent a first side of the memory 213, the back of the memory 213 corresponds memory cells of the memory 213 disposed in a second region (e.g., back memory cells) that are adjacent a second side of the memory 213 that opposes the first side, the front memory cells are closer to the first side and the back memory cells are closer to the second side.

The FTL 211 checks whether the sub-address mapping table has been boosted based on the result of the event (S130).

Referring to FIG. 9 as an example, the FTL 211 may confirm a result that the received 0_0 sub-address mapping table sAMT00, 0_1 sub-address mapping table sAMT01, 0_2 sub-address mapping table sAMT02, and 0_(n−1) sub-address mapping table sAMT0(*n*−1) perform the update operation based on the result of the event, and the FTL 211 may check whether the result of performing the update operation for each of the sub-address mapping tables SAMT00, SAMT01, SAMT02, and sAMT0(*n*−1) is boosted.

According to an embodiment, the FTL 211 logs the continuity of the address mapping information while performing the update on the received sub-address mapping table. Through the continuity log of the address mapping information as described above, the FTL 211 may check whether the sub-address mapping table updated as the result of the event is boosted.

According to an embodiment, the FTL 211 checks whether the updated sub-address mapping table is boosted according to the characteristic of the event.

If it is confirmed that the sub-address mapping table has been boosted, the FTL 211 performs the first update operation on the sub-address mapping table to update the meta data mapping table (S140).

Figures 11, 12:
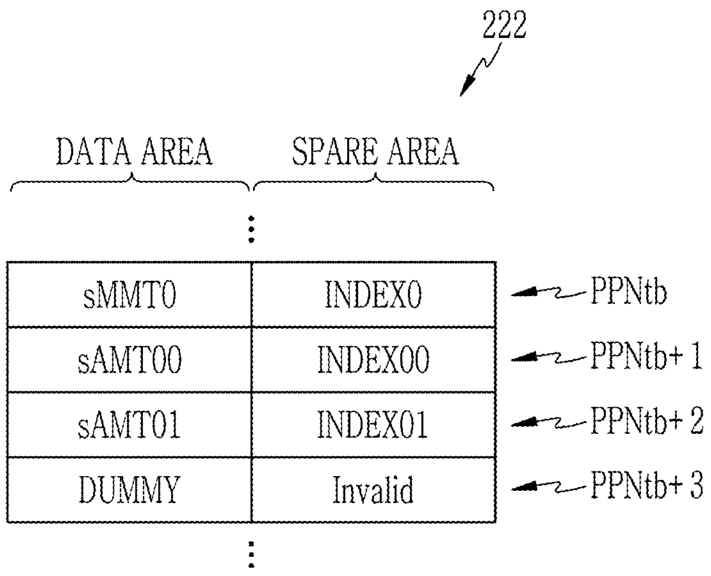

Referring to FIG. 9 and FIG. 11 as an example, the FTL 211 may confirm that the 0_2 sub-address mapping table sAMT02 and the 0_(n−1) sub-address mapping table sAMT0(*n*−1), which were updated by the event, have been boosted.

According to the confirmation, the FTL 211 may perform the first update operation by updating the meta data corresponding to the 0_2 index INDEX02 and the 0_(n−1) index INDEX0(*n*−1) within the 0-th sub-meta data mapping table sMMT0.

Through the first update operation, the boost flag bit BF corresponding to the 0_2 index INDEX02 may maintain logic high H, and the start page START_PPN corresponding to the 0_2 index INDEX02 may be changed from vacant data to a 4m page PPN4*m*. According to an embodiment, through the event, the address mapping information in the 0_2 sub-address mapping table sAMT02 may be updated to a sequential writing state in an invalidated state.

Through the first update operation, the boost flag bit BF corresponding to the 0_(n−1) index INDEX0(*n*−1) may be changed from logic low L to logic high H, and the start page START_PPN corresponding to the 0_(n−1) index INDEX0 (*n*−1) may be changed from vacant data to a 5m page PPN5*m*.

According to an embodiment, the first update operation may be performed with an overwrite operation for the 0-th sub-meta data mapping table sMMT0 loaded in the memory 213.

According to an embodiment, in the first update operation, the updates for the address mapping information in the 0_2 sub-address mapping table sAMT02 and the 0_(n−1) sub-address mapping table sAMT0(*n*−1) are not performed.

The FTL 211 loads the sub-address mapping table on which the first update operation is performed from the back of the memory 213 (S150).

Referring to FIG. 9 as an example, the FTL 211 may load the 0_2 sub-address mapping table sAMT02 and the 0_(n−1) sub-address mapping table SAMT0(*n*−1) from the back end of the memory 213 in the order of the first update operation.

If it is confirmed that the sub-address mapping table is not boosted, the FTL 211 performs the update on the sub-address mapping table to perform a second update operation on the sub-address mapping table (S160).

Referring to FIG. 9 and FIG. 11 as an example, the FTL 211 may confirm that the 0_0 sub-address mapping table sAMT00 and the 0_1 sub-address mapping table sAMT01, which were updated by the event, were not boosted.

According to the confirmation, the FTL 211 may perform the second update operation by updating the address mapping information in the 0_0 sub-address mapping table sAMT00 and the 0_1 sub-address mapping table sAMT01.

According to an embodiment, the FTL 211 may reflect the updated address mapping information in the 0_0 sub-address mapping table sAMT00 and the 0_1 sub-address mapping table sAMT01 to the 0-th sub-meta data mapping table sMMT0.

According to an embodiment, the reflection operation for the 0-th sub-meta data mapping table sMMT0 may be performed as an overwrite operation for the memory 213.

Through the reflection operation, the boost flag bit BF corresponding to the 0_0 index INDEX00 may be changed from logic high H to logic low L, the start page START_PPN corresponding to the 0_0 index INDEX00 may be maintained as the 0-th page PPN0, and the table page corresponding to the 0_0 index INDEX00 may be changed from first table page PPNt1 to the (b+1) th table page PPNt(b+1).

Likewise, through the reflection operation, the boost flag bit BF corresponding to the 0_1 index INDEX01 may be maintained at logic low L, the start page START_PPN corresponding to the 0_1 index INDEX01 may be maintained as vacant data, and the table page corresponding to the 0_1 index INDEX01 may be changed from the second table page PPNt2 to the (b+2) th table page PPNt(b+2).

The content of the reflection operation is an example to aid an understanding and embodiments of the disclosure are not limited thereto.

Due to the change in the table page, the 0-th sub-meta data mapping table sMMT0, the 0_0 sub-address mapping table sAMT00, and the 0_1 sub-address mapping table sAMT01 stored in the 0-th to second table pages PPNt0-to PPNt2 may be invalidated.

The FTL 211 loads the sub-address mapping table on which the second update operation is performed from the front of the memory 213 (S170).

Figure 10:
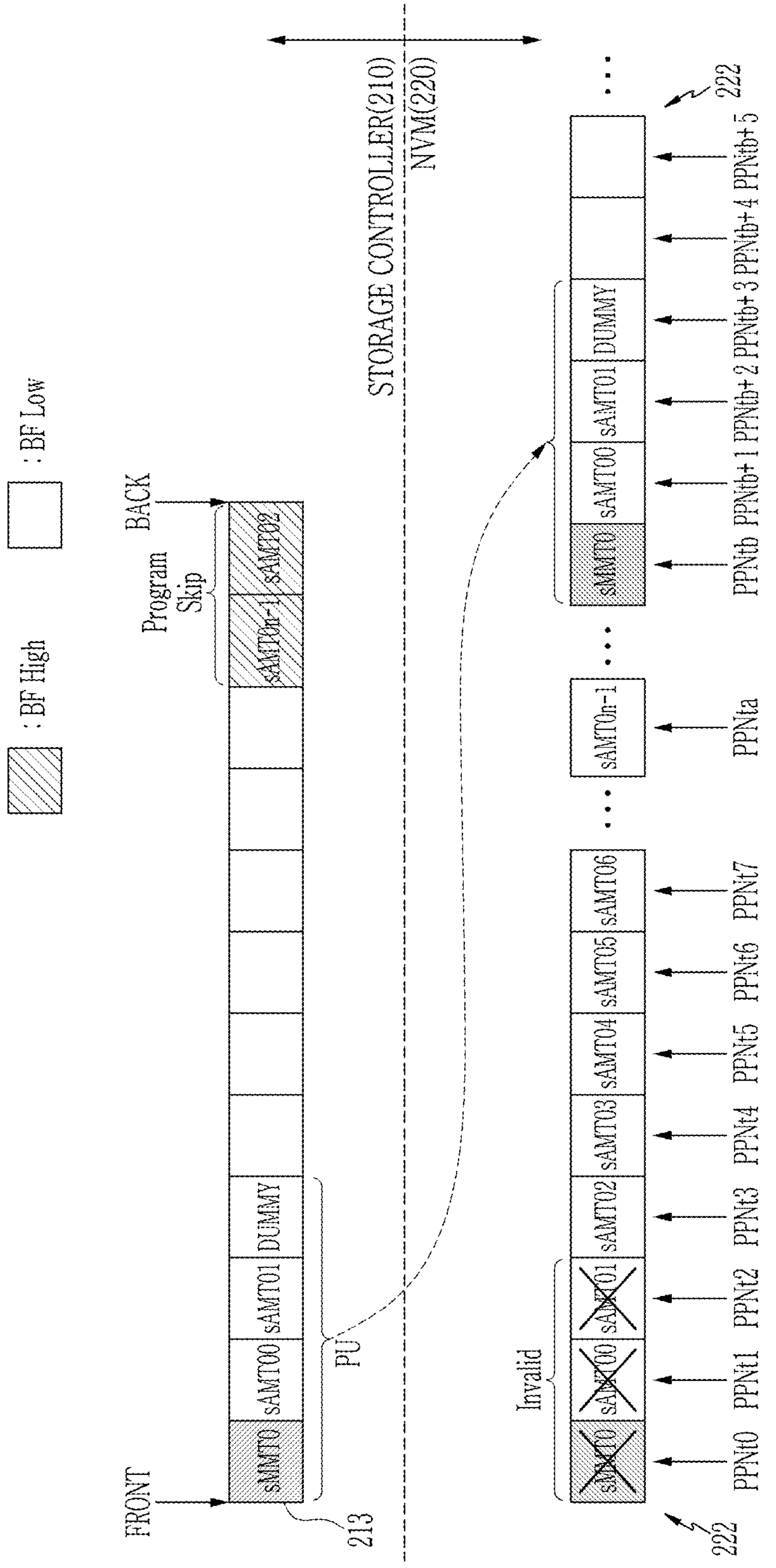

Referring to FIG. 10, the FTL 211 may load the 0_0 sub-address mapping table sAMT00 and the 0_1 sub-address mapping table sAMT0(*n*−1) from the front of the memory 213 in the order of the second update operation.

The FTL 211 aligns the sub-address mapping table loaded from the front of the memory 213 based on a program unit (PU) (S180).

Referring to FIG. 10 as an example, the 0-th sub-meta data mapping table sMMT0, the 0_0 sub-address mapping table SAMT00, and the 0_1 sub-address mapping table sAMT01 loaded from the front of the memory 213 may be 4 KB. According to an embodiment, for data reliability reasons, the program unit PU of the non-volatile memory device 220 may be 16 KB.

According to an embodiment, in the align operation, the FTL 211 may create a dummy address mapping table DUMMY of the same size as the sub-address mapping table and load it from the front of the memory 213.

The FTL 211, through the creation of the dummy address mapping table DUMMY, may load the 0-th sub-meta data mapping table sMMT0, the 0_0 sub-address mapping table SAMT00, the 0_1 sub-address mapping table SAMT01, and the dummy address mapping table DUMMY, which are the same as the size of the program unit PU, from the front of the memory 213.

The storage controller 210 performs a flush operation based on the sub-meta data mapping table and the sub-meta data mapping table arranged at the front of the memory 213 (S190).

The storage controller 210 may provide the 0-th sub-meta data mapping table sMMT0, the 0_0 sub-address mapping table SAMT00, the 0_1 sub-address mapping table sAMT01, and the dummy address mapping table DUMMY, which are aligned on the front of the memory 213 with the size of the program unit PU, to the non-volatile memory device 220.

The non-volatile memory device 220 may program the 0-th sub-meta data mapping table sMMT0, the 0_0 sub-address mapping table sAMT00, the 0_1 sub-address mapping table sAMT01, and the dummy address mapping table DUMMY to the meta area 222.

Referring to FIG. 10 and FIG. 12 as an example, the 0-th sub-meta data mapping table sMMT0 may be programmed in the b-th table page PPNtb of the meta area 222, the 0_0 sub-address mapping table SAMT00 may be programed in the (b+1)+th table page PPNt(b+1), the 0_1 sub-address mapping table sAMT01 may be programed in the (b+2)+th table page PPNt(b+2), and the dummy address mapping table DUMMY may be programed in the b+3 table page PPNt(b+3).

According to an embodiment, the 0_2 sub-address mapping table SAMT02 and the 0_(n−1) sub-address mapping table sAMT0(*n*−1) loaded to the back of the memory 213 may be program-skipped.

According to an embodiment, the storage controller 210 does not perform the updates on the address mapping information in the 0_2 sub-address mapping table sAMT02 and the 0_(n−1) sub-address mapping table sAMT0(*n*−1), and does not provide the load 0_2 sub-address mapping table sAMT02 and 0_(n−1) sub-address mapping table sAMT0(*n*−1) to the non-volatile memory device 220.

In the meta area 222, like the information stored in the 0-th sub-meta data mapping table sMMT0, the 0_0 sub-address mapping table sAMT00 may be stored in the data area of the (b+1)+th table page PPNt(b+1), and the 0_0 index INDEX00 may be stored in the spare area of the (b+1)+th table page PPNt(b+1). The 0_1 sub-address mapping table sAMT01 may be stored in the data area of the (b+2)+th table page PPNt(b+2), and the 0_1 index INDEX01 may be stored in the spare area of the (b+2)+th table page PPNt(b+2). The dummy address mapping table DUMMY may be stored in the data area of the (b+3)+th table page PPNt(b+3), and an invalid information may be stored in the spare area of the (b+3) table page PPNt(b+3). Through the invalid information, it may be confirmed that the dummy address mapping table DUMMY is stored in the data area of the b+3 table page PPNt(b+3).

According to an embodiment, the 0-th sub-meta data mapping table sMMT0 may be stored in the data area of b-th table page PPNtb, and the 0-th index INDEX0 may be stored in the spare area of b-th table page PPNtb.

In the step (S190) of performing the flush operation, the existing 0-th sub-meta data mapping table sMMT0, 0_0 sub-address mapping table sAMT00, and 0_1 sub-address mapping table sAMT01 stored respectively in the 0-th to second table pages PPNt0 to PPNt2 may be invalidated.

In the storage device 200 according to an embodiment, the update operation and the flush operation of the boosted sub-address mapping table, may be replaced with the update operation and the flush operation of the meta data for the sub-address mapping table and the program operation for the sub-address mapping table itself may be skipped.

According to an embodiment, the storage device 200, through the replacement of the update operation and the flush operation as discussed above, may reduce the size of the meta data flushed between the storage controller 210 and the non-volatile memory device 220, thereby increasing the performance of the flush operation.

According to an embodiment, the storage device 200, through the replacement of the update operation and the flush operation as discussed above, may reduce the amount of the meta data programmed in the meta area 222 of the non-volatile memory device 220, thereby increasing the lifespan reliability of the meta area.

Figure 13:
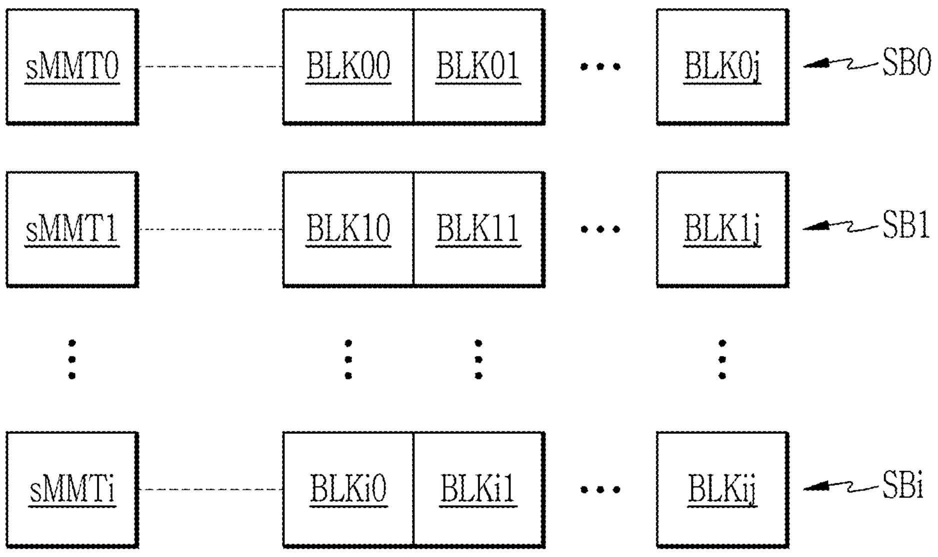
FIG. 13 is a view to explain an operation of a storage device according to an embodiment.

FIG. 13 is a view to explain an operation of a storage device according to an embodiment. Referring to FIG. 1 and FIG. 13, the user area 221 includes a plurality of memory blocks BLK00 to BLKij. The plurality of memory blocks BLK00 to BLKij may be managed as a predetermined unit. For example, the plurality of memory blocks BLK00 to BLKij may be managed as a single super block unit. The storage controller 210 may manage the plurality of sub-meta data mapping tables sMMT0 to sMMTi for each of the plurality of super blocks SB0 to SBi.

As described above, the storage controller 210 may manage the plurality of memory blocks BLK00 to BLKij as a super block unit.

Figure 14:
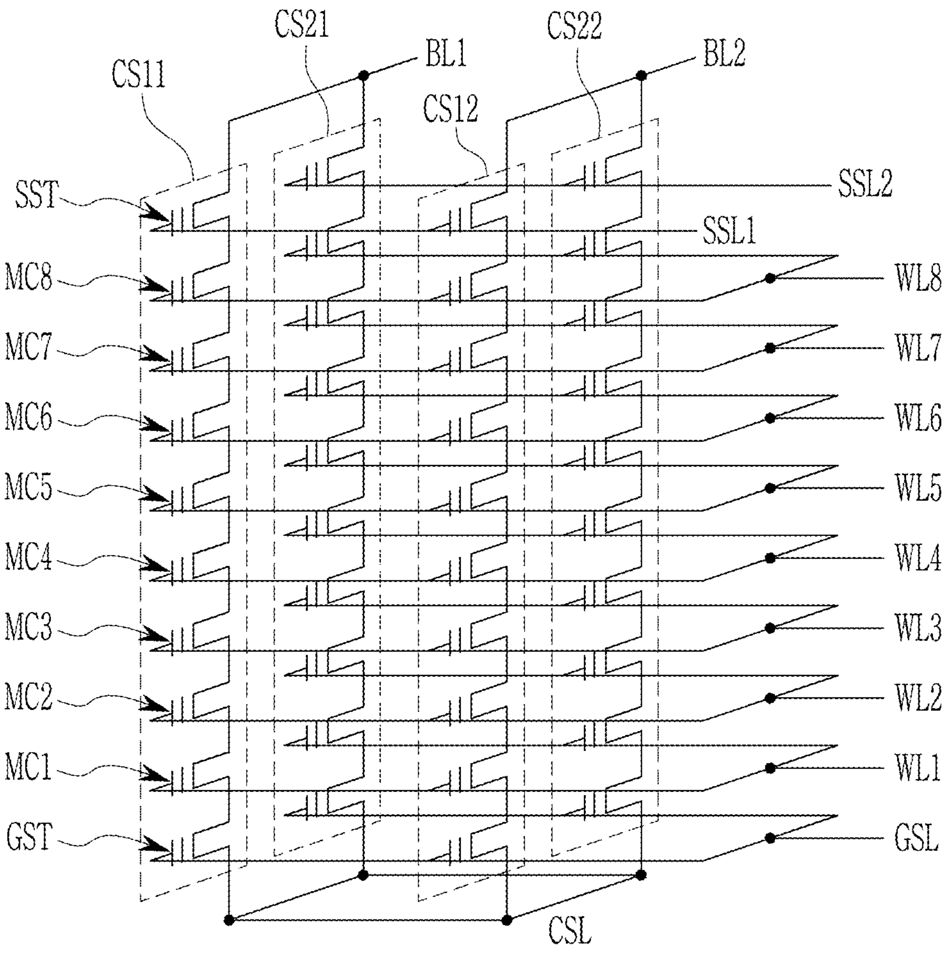
FIG. 14 is a circuit diagram illustrating one memory block among a plurality of memory blocks included in a memory cell array according to an embodiment.

FIG. 14 is a circuit diagram illustrating one memory block among a plurality of memory blocks included in a memory cell array according to an embodiment. For example, FIG. 14 shows the first memory block BLK1, but the range of the present disclosure is not limited thereto, and the plurality of memory blocks included in the non-volatile memory device 220 may the same structure as the first memory block shown in FIG. 14.

Referring to FIG. 14, the first memory block BLK1 may include the plurality of cell strings CS11 to CS12, and CS21 to CS22. The plurality of cell strings CS11 to CS12, and CS21 to CS22 may be connected between bit lines BL1 and BL2 and a common source line CSL. The plurality of cell strings CS11 to CS12, and CS21 to CS22 may each include a string selection transistor SST, a plurality of memory cells MC1 to MC8, and a ground selection transistor GST, which are stacked in a vertical direction to a substrate.

The string selection transistors SST may each be connected to string selection lines SSL1 to SSL2. The plurality of memory cells MC1 to MC8 may be respectively connected to a plurality of word lines WL1 to WL8. The ground selection transistor GST may be connected to a ground selection line GSL. The string selection transistor SST may be connected to the bit lines BL1 and BL2, and the ground selection transistor GST may be connected to the common source line CSL. The word lines (e.g., WL1) of the same height may be connected in common. As an example, when programming memory cells connected to the first word line WL1 and included in the cell strings CS11 and CS12, the first word line WL1 and the first string selection line SSL1 may be selected. According to an embodiment, the memory cells may be a charge trap flash (CTF) memory cell The first memory block BLK1 shown in FIG. 14 is exemplary. The present disclosure is not limited to the memory block BLK1 shown in FIG. 14.

According to an embodiment, rows and columns of the plurality of cell strings CS11 to CS12, and CS21 to CS22 may be arranged in various ways. In FIG. 14, the plurality of cell strings CS11 to CS12, and CS21 to CS22 in the first memory block BLK1 are shown with two rows and two columns each, but are not limited thereto.

Additionally, according to an embodiment, each height of the plurality of cell strings CS11 to CS12, and CS21 to CS22 may be increased or decreased. According to an embodiment, the number of the word lines connected to one cell string, and the number of the string selection lines or the ground selection lines may be changed.

Figure 15:
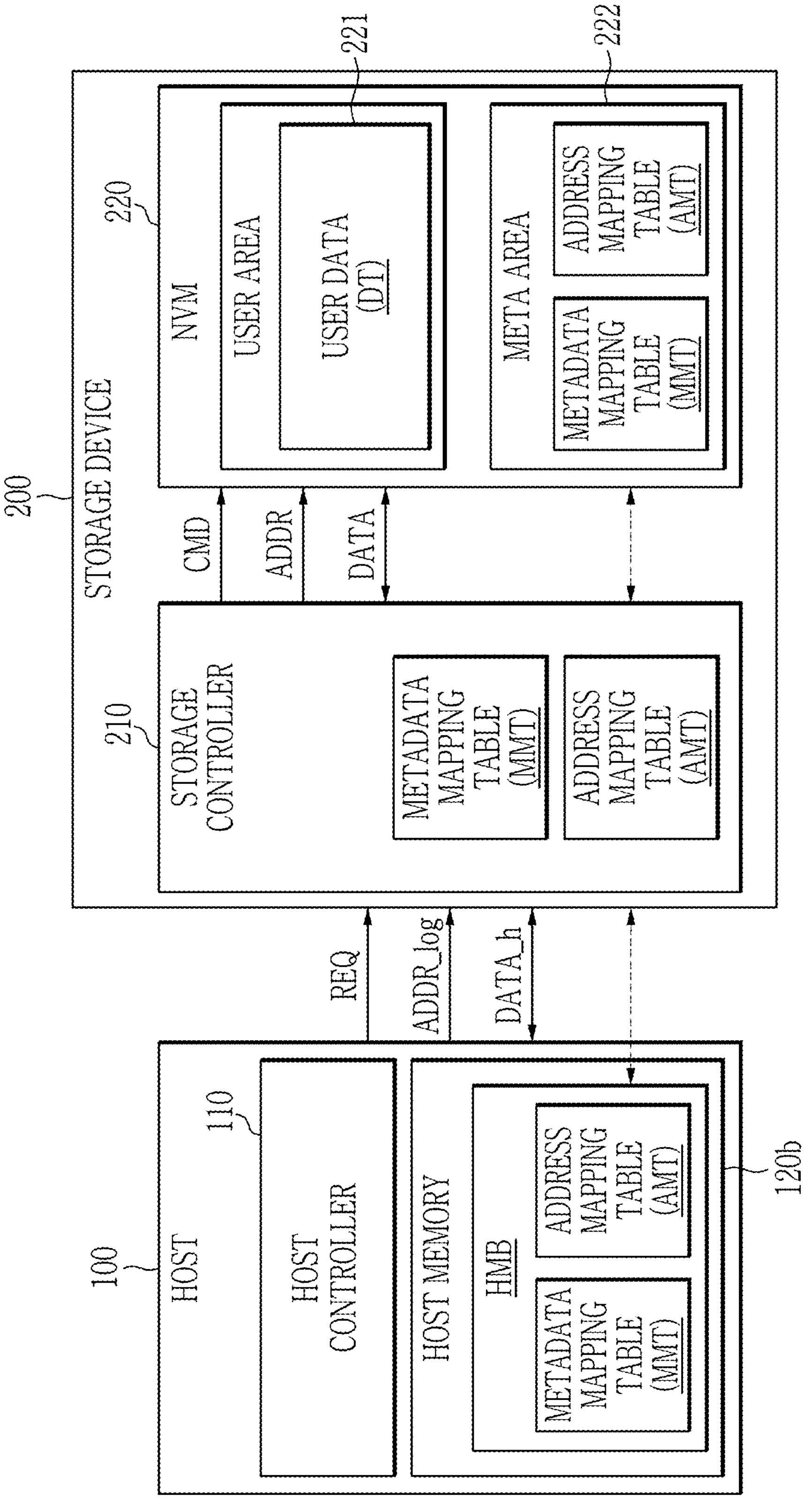
FIG. 15 is a block diagram showing a storage system according to an embodiment.

FIG. 15 is a block diagram showing a storage system according to an embodiment. The storage system 10*b* of FIG. 15 and the storage system 10*a* of FIG. 1 may correspond to each other, and the host 100 and the storage device 200 of FIG. 15 may correspond to the host 100 and the storage device 200 of FIG. 1. For ease of explanation, common content is omitted and thus the following explanation focuses primarily on differences.

Referring to FIG. 15, the host memory 120*b* may include a host memory buffer HMB. The host memory 120*b* may include a host memory buffer HMB in which some areas are allocated as a buffer of the storage device 200. According to an embodiment, the host memory buffer HMB may be controlled by the storage controller 210.

The host memory buffer HMB is allocated for the storage device 200 to use the host memory 120*b* as a buffer. According to an embodiment, the host memory buffer HMB may perform the same operation as the memory 213 in FIG. 4.

According to an embodiment, the address mapping table AMT and the meta data mapping table MMT read from the non-volatile memory device 220 may be loaded into the host memory buffer HMB and be managed by the processor 212 through the update operation, the flush operation, etc.

According to an embodiment, the host memory buffer HMB may load a portion of the address mapping table AMT and the meta data mapping table MMT stored in the meta area 222 of the non-volatile memory device 220, but is not limited thereto. For example, the entire mapping table AMT and meta data mapping table MMT may be loaded into the host memory buffer HMB.

According to an embodiment, the storage controller 210 may perform the same update operation and flush operation for the address mapping table AMT and meta data mapping table MMT loaded in the host memory buffer HMB as the update operation and flush operation for the address mapping table AMT and meta data mapping table MMT loaded in the memory 213 described in FIG. 1 to FIG. 14.

Figure 16:
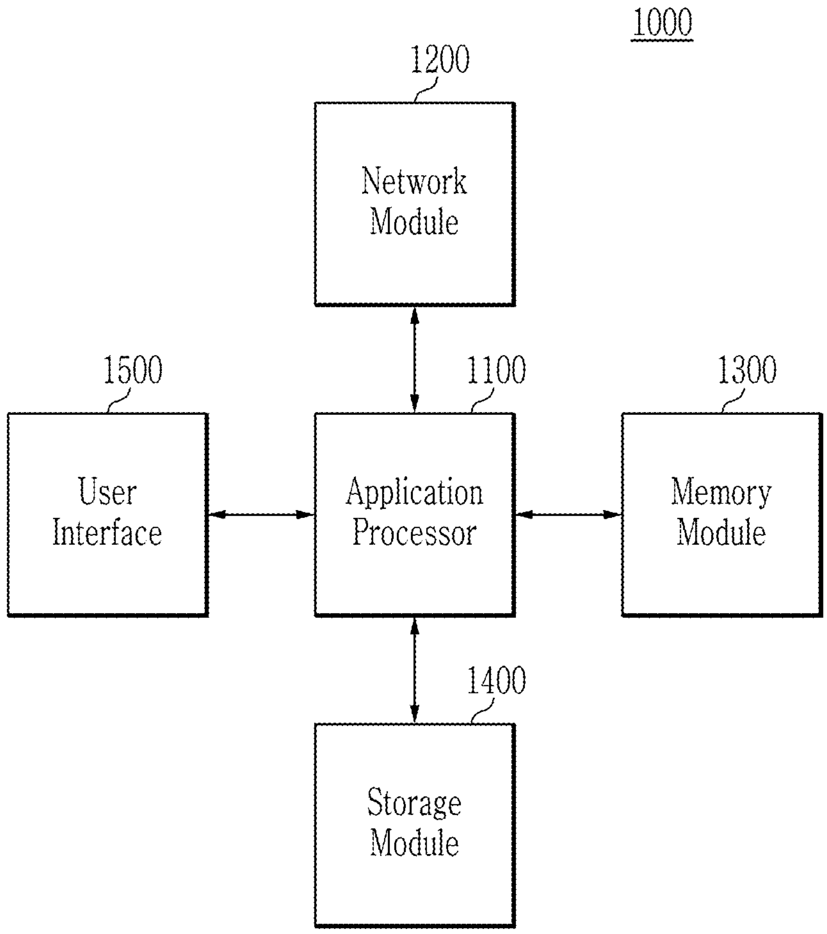
FIG. 16 is a block diagram illustrating a mobile system to which a storage system according to an embodiment is applied.

FIG. 16 is a block diagram illustrating a mobile system to which a storage system according to an embodiment is applied.

FIG. 16 is a block diagram illustrating a mobile system according to an embodiment. Referring to FIG. 16, a mobile system 1000 includes an application processor 1100, a memory module 1300, a network module 1200, a storage module 1400, and a user interface 1500. The application processor 1100 is a configuration corresponding to the host 100 in FIG. 1 so that a detailed description thereof may be replaced with the explanation in FIG. 1.

The memory module 1300 may operate as a main memory, an operation memory, a buffer memory or a cache memory of the mobile system 1000. The memory module 1300 may include a volatile random access memory such as a DRAM, a SDRAM, a DDR SDRAM, a DDR2 SDRAM, a DDR3 SDRAM, a LPDDR SDARM, a LPDDR3, a SDRAM, a LPDDR3 SDRAM or a non-volatile random access memory such as a PRAM, a ReRAM, a MRAM, or a FRAM.

The network module 1200 may communicate with external devices. For example, the network module 1200 may support a wireless communication such as a code division multiple access (CDMA), a global system for mobile communication (GSM), a wideband CDMA (WCDMA), a CDMA-2000, a time division multiple access (TDMA), a long term evolution (LTE), a Wimax, a WLAN, a UWB, a Bluetooth, a WI-DI, etc.

The storage module 1400 may store data. For example, the storage module 1400 may store a data received from the outside. Alternatively, the storage module 1400 may transmit the data stored in the storage module 1400 to the application processor 1100. For example, the storage module 1400 may be implemented as a non-volatile semiconductor memory device such as a phase-change RAM (PRAM), a magnetic RAM (MRAM), a resistive RAM (RRAM), a NAND flash, a NOR flash, and a 3-dimensional NAND flash. For example, the storage module 1400 may be provided as a solid state drive (SSD), a multimedia card (MMC), an embedded multimedia card (eMMC), a universal flash storage (UFS), etc.

The storage module 1400, in the update operation and the flush operation of the sub-address mapping table boosted like FIG. 1 to FIG. 15, may be replaced with the update operation and flush operation of the meta data for the sub-address mapping table and skip the program operation for the sub-address mapping table itself.

According to an embodiment, the storage module 1400 may increase the performance of the flush operation by reducing the size of the meta data flushed between the storage controller and the internal non-volatile memory device through the replacement of the update operation and flush operation as described above.

According to an embodiment, the storage module 1400 may increase the lifespan reliability of the meta area by reducing the amount of the meta data programmed in the meta area of the non-volatile memory device through the replacement of the update operation and flush operation as described above.

At least one embodiment of the disclosure provides a non-volatile storage device that whose performance of flush operations is increased and has a meta data area with increased reliability. The management of its address mapping may be optimized. The storage device includes a user area and a meta area. The meta area contains an address mapping table and a metadata mapping table. The address mapping table includes sub-address mapping tables that map logical addresses to physical addresses. Each sub-address mapping table has corresponding metadata, which includes a flag indicating the state of the table (e.g., whether it is in a sequential arrangement or not) and the starting page of the physical address range. When an event occurs, such as a read/write request or an internal operation like garbage collection, the storage controller updates the sub-address mapping tables. A controller of the storage device checks the state of the sub-address mapping table. If a sub-address mapping table is in a state where its address mapping information is sequentially arranged or invalid, the controller updates the corresponding metadata without fully rewriting the table. This selective updating reduces the amount of data that needs to be flushed, thereby increasing performance. By minimizing the amount of metadata that needs to be written during updates, the storage device reduces wear on the memory cells, thereby extending their lifespan. This approach also reduces the operational overhead, leading to more efficient flush operations.

While this disclosure has been described in connection with example embodiments, it is to be understood that the disclosure is not limited to these embodiments, but, on the contrary, is intended to cover various modifications and equivalent arrangements included within the spirit and scope of the appended claims.

What is claimed is:

1. A storage device comprising:

a non-volatile memory device comprising a user area including a plurality of first memory blocks, and a meta area comprising an address mapping table including address mapping information for the plurality of first memory blocks and a meta data mapping table including meta data for the address mapping table, wherein the address mapping table includes a sub-address mapping table, and the meta data mapping table includes meta data for the sub-address mapping table; and a storage controller configured to update at least one of the meta data to perform a first update operation and address mapping information of the sub-address mapping table to perform a second update operation within the storage controller, and flush the meta data for the sub-address mapping table into the meta area based on the first update operation in response to a boost flag bit indicating the sub-address mapping table is boosted, wherein the sub-address mapping table is program-skipped in a flush operation.

2. The storage device of claim 1, wherein:

the meta area includes a plurality of second memory blocks that are different from the plurality of first memory blocks, and the plurality of second memory blocks are single level cell (SLC) blocks.

3. The storage device of claim 1, wherein the boost flag bit is included in the meta data, and the meta data includes a boost flag bit indicating consecutive placement of the address mapping information or an invalidity of the address mapping table, a starting page of a physical page number corresponding to a minimum logical page number of the address mapping table, and a table page of a physical address of the address mapping table.

4. The storage device of claim 3, wherein the boost flag bit is a logic high, and the starting page includes a valid physical address.

5. The storage device of claim 3, wherein the boost flag bit is a logic high, and the starting page includes vacant data.

6. The storage device of claim 3, wherein the boost flag bit is a logic low.

7. The storage device of claim 1, wherein the storage controller includes a memory into which the sub-address mapping table is loaded.

8. The storage device of claim 7, wherein the storage controller further includes a flash translation layer configured to perform the first and second update operations and load the sub-address mapping table into the memory.

9. The storage device of claim 7, wherein the memory is a static random-access memory (SRAM) or a dynamic random-access memory (DRAM), and the first update operation is performed as an overwrite operation on the meta data mapping table.

10. The storage device of claim 1, wherein the address mapping information includes a mapping between a logical page and a physical page in the user area.

11. An operation method of a storage device comprising:

receiving a sub-address mapping table and meta data for the sub-address mapping table in response to an occurrence of an event;

loading a meta data mapping table including the meta data into a memory;

checking whether the sub-address mapping table is boosted based on the event;

updating the meta data to perform a first update operation when a result of the checking indicates the sub-address mapping table is boosted;

updating address mapping information of the sub-address mapping table to perform a second update operation when the result indicates the sub-address mapping table is not boosted; and flushing the meta data for the sub-address mapping table to a non-volatile memory included in the storage device based on the first update operation in response to a boost flag bit indicating the sub-address mapping table is boosted, wherein the sub-address mapping table is program-skipped in the flushing.

12. The operation method of the storage device of claim 11, further comprising:

loading the sub-address mapping table on which the second update operation was performed into the memory before the flushing; and aligning the sub-address mapping table loaded into the memory according to a predetermined program unit.

13. The operation method of the storage device of claim 12, wherein:

a size of the predetermined program unit is 16 Kilobytes (KB), and a size of the sub-address mapping table is 4 KB.

14. The operation method of the storage device of claim 13, wherein:

the aligning includes creating a dummy address mapping table of 4 KB size, and the flushing includes programming the dummy address mapping table to the non-volatile memory device.

15. The operation method of the storage device of claim 12, further comprising:

loading the sub-address mapping table on which the first update operation was performed into the memory before the flushing.

16. The operation method of the storage device of claim 15, wherein:

in the first update operation, an update for the address mapping information of the sub-address mapping table is not performed.

17. A storage system comprising:

a storage device storing data; and a host providing a request for the data to the storage device and including a host memory, wherein the storage device comprises:

a non-volatile memory device including a user area including a plurality of first memory blocks configured to store the data, and a meta area comprising an address mapping table including address mapping information for the plurality of first memory blocks and a meta data mapping table including meta data for the address mapping table, wherein the address mapping table includes a sub-address mapping table, and the meta data mapping table includes meta data for the sub-address mapping table; and a storage controller configured to update at least one of the meta data to perform a first update operation and the address mapping information to perform a second update operation within the storage controller, and flush the meta data for the sub-address mapping table into the meta area based on the first update operation in response to a boost flag bit indicating the sub-address mapping table is boosted, wherein the sub-address mapping table is program-skipped in the flushing.

18. The storage system of claim 17, wherein:

the host memory includes a host memory buffer allocated as a buffer of the storage device, the host memory buffer includes the address mapping table and the meta data mapping table, and the storage controller is configured to flush the address mapping table included in the host memory buffer into the meta area.

19. The storage system of claim 17, wherein:

the first and second update operations are performed based on a write request for the data or a discard request for the data of the host.

* * * * *